(12) United States Patent
Hsu

(10) Patent No.: US 7,433,029 B1
(45) Date of Patent: Oct. 7, 2008

(54) METHOD AND SYSTEM TO CALIBRATE A CAMERA SYSTEM USING PHASE DEMODULATION SENSING

(75) Inventor: Stephen C. Hsu, Sunnyvale, CA (US)

(73) Assignee: Canesta, Inc., Sunnyvale, CA (US)

( * ) Notice: Subject to any disclaimer, the term of this patent is extended or adjusted under 35 U.S.C. 154(b) by 61 days.

(21) Appl. No.: 11/523,871

(22) Filed: Sep. 20, 2006

Related U.S. Application Data

(60) Provisional application No. 60/719,621, filed on Sep. 22, 2005.

(51) Int. Cl.
*G01B 11/26* (2006.01)
(52) U.S. Cl. .................................... 356/141.5
(58) Field of Classification Search ....... 356/3.01–3.15, 356/4.01–4.1, 5.01–5.15, 6–22, 28, 28.5, 356/139.01–139.1, 141.1–141.5
See application file for complete search history.

(56) References Cited

U.S. PATENT DOCUMENTS
2006/0056655 A1\* 3/2006 Wen et al. ............... 382/103

\* cited by examiner

*Primary Examiner*—Thomas H. Tarcza
*Assistant Examiner*—Luke D Ratcliffe
(74) *Attorney, Agent, or Firm*—Canesta, Inc.; Michael A. Kaufman, Esq.

(57) ABSTRACT

A preferably parametrically defined calibration target pattern definable in real-world coordinates $(X_i, Y_i)$ is used to spatially calibrate a camera system acquiring images in pixel coordinates $(x_i, y_i)$. The calibration target pattern is used to produce a unique 1:1 mapping enabling the camera system to accurately identify each point in the calibration target pattern point mapped to each pixel in the acquired image. Preferably the calibration target pattern is pre-distorted and includes at least two sinusoids that create a pattern of distorted wavefronts that when imaged by the camera system will appear substantially linearized. Since wavefront locations on the calibration target pattern were known, a mapping between those wavefronts and the substantially linearized wavefront pattern on the camera system captured image can be carried out. Demodulation of the captured image enables recovery of the continuous wave functions therein, using spectral analysis and iteration.

30 Claims, 3 Drawing Sheets

METHOD AND SYSTEM TO CALIBRATE A CAMERA SYSTEM USING PHASE DEMODULATION SENSING

RELATIONSHIP TO CO-PENDING APPLICATION

Priority is claimed to U.S. provisional patent application Ser. No. 60/719,621 filed 22 Sep. 2005, entitled Phase Demodulation Method of Camera Calibration.

FIELD OF THE INVENTION

The present invention relates generally to imaging and camera systems, and more specifically to calibrating such systems.

BACKGROUND OF THE INVENTION

FIG. 1 depicts a generic camera system 10, that acquires and forms an image 20 of a typically three-dimensional target object 30 located at distance Z from the camera system. Camera system 10 typically includes a lens or optical system 40 through which optical energy rays 50 from the target object pass, to form image 20 on an array or other medium 60. For purposes of the present invention, camera system 10 (or more simply, camera 10) can include any type of image forming camera, and may, for example, include two-dimensional focal plane arrays, scanned linear arrays, scanned single pixel configurations. Camera system 10 may utilize any imaging modality and wavelength, including without limitation, radar, visible or IR light, acoustic energy, etc. Thus, in the broadest sense, "distortion" as used herein need not be restricted to distortion created by an optical lens in a camera system under calibration. Further, camera system 10 may include three-dimensional range or time-of-flight (TOF) cameras such as disclosed in U.S. Pat. No. 6,323,942 (2001) CMOS-Compatible Three-Dimensional Imaging System, as well as two dimension intensity or RGB cameras. Indeed, camera system 10 may be implemented as an analog or digital electronic camera, as well as a film-based camera, whose image has been scanned into electronic form.

But to utilize a camera as a device to measure geometry of a three-dimensional scene, e.g., target object 30, it is important to accurately calibrate the interior orientation of the camera, namely the relationship between every point in the camera-captured image 20, and optical energy rays 50 in three-dimensional space exterior to the camera. For example, plane or medium 60 may be defined as a plurality of points, or pixels, each point uniquely identifiable in terms of coordinates $(x_i, y_i)$. In an ideal camera system, there would be a perfectly linear 1:1 mapping between each pixel location on plane 60, and a corresponding portion $(X_i, Y_i)$ of object 30. Indeed, a uniquely identifiable vector ray (or boresight line) could be drawn between portions of object 30, and the pixel locations on plane 60 receiving intensity (or color) information from that object portion. Stated differently, in a perfectly calibrated system, there would be a known linear association between every pixel location on plane 60 with a boresight angle or vector direction towards a corresponding point on the calibration target object.

But in practice, identifying points in the captured image and locating these points in the target can be time consuming. While the distance Z is known, the relationship between points or pixels $(x_i, y_i)$ in the captured image, and points $(X_i, Y_i)$ in the target is not known. One could of course determine individual points in the target, one-by-one, and determine their pixel location counterpart in the captured image. The results of such time consuming calibration could then be used to construct a look-up-table that correlated real-world target location coordinates $(X_i, Y_i)$ of any point on the target that is imaged, to each pixel location $(x_i, y_i)$ in the captured image. Thereafter when imaging other targets at other distances Z, the look-up-table could be consulted to learn where in the real-world individual pixel locations refer. Generally, camera system imperfections, perhaps due to imperfect optics 40, result in a mapping that is not perfectly linear. The result is distortion in image 20 captured by camera 10 from object 30, with distortion generally being more severe at the corners than at the center of the captured image. It is a function of a calibration system to try to arrive at a mapping that preferably can also be used to correct for such distortions. It will be appreciated that while lens 40 typically distorts the captured image, the nature of the distortion will generally be a smooth function between adjacent pixel locations in the camera-captured image 20.

In calibrating a camera, typically a picture is taken of a planar calibration target object with known pattern at a known distance Z from the camera. If calibration were perfect, or if optical lens 40 were perfect there would be a perfectly linear 1:1 mapping between every pixel $(x_i, y_i)$ in plane 60 associated with camera 10, and with every point $(X_i, Y_i)$ in the calibration target. In reality, distortion, e.g., from lens 40, occurs. In FIG. 1, one might use as target object 30 a planar calibration target, perhaps having a pattern of parallel horizontal lines. But such a calibration target cannot be used satisfactorily to arrive at a desired linear mapping at all points, as essentially no useful calibration information is obtained regarding calibration target points removed from the various parallel horizontal lines. A second target, perhaps with parallel vertical lines, could contribute additional calibration information, as might using a third calibration target with concentric circles. But using multiple calibration targets to obtain additional calibration data would of course lengthen the time needed to accomplish calibration.

To more efficiently implement calibration in obtaining a desired interior orientation, it is preferred to estimate a dense correspondence field between points $(X_i, Y_i)$ in a known calibration target pattern and points in pixels $(x_i, y_i)$ in the camera-captured image 20 formed of the target pattern on plane 60. But when optics 40 are not ideal and exhibit distortion, the desired correspondence is not necessarily a projective transformation or other simple parametric model. In general, the desired correspondence requires representation as a flow field.

Several automatic methods for estimating the correspondence field are known in the art. If the target pattern contains distinct features, feature extraction and matching may be used to provide a sparse mapping that can be interpolated into a dense field. If the target pattern contains rich texture, general image-to-image optical flow estimation techniques can be used.

But such prior art techniques have several drawbacks, including sensitivity to orientation and scale of the pattern. Frequently prior art calibration techniques are simply too sensitive to variations in brightness and contrast, and distortion in the camera lens. In short, such prior art techniques cannot always reliably provide a desired dense correspondence under practical environmental conditions.

What is needed is a method and system to calibrate a camera system, with substantial independence from orientation and scale of the calibration pattern, variations in brightness and contrast, and optical component imperfections. Calibration should include imaging a calibration target with a pattern that rapidly facilitates spatial calibration of the camera under calibration, such that pixels or points $(x_i, y_i)$ in the captured image can be identified and located with respect to real-world coordinates $(X_i, Y_i)$ in the calibration target. Use of a suitable target facilitates construction of a mapping that relates each pixel in a capture image to a real-world coordinate of a target object, a distance Z away. Since most camera systems introduce optical distortion, preferably some knowledge of the distortion characteristics of the camera system under calibration can be initially determined. This a priori distortion information is then used to create a calibration target pattern that preferably is pre-distorted, such that the camera-captured image will be substantially undistorted. Analysis of distortion in the camera-captured image should enable relatively rapid and accurate linear mapping with a dense correspondence.

The present invention provides such a method and system.

SUMMARY OF THE PRESENT INVENTION

The present invention provides a simple technique for calibrating a camera using phase estimation, and a continuous gray scale (or color scale) rather than sharp-edged target recognizable by the camera, for example a multi-sinusoidal calibration target pattern. Preferably the calibration target includes a pattern such that the camera-captured image of the pattern enables spatial calibration of the camera enabling the camera to discern real-world $(X_i, Y_i)$ calibration target coordinates and to enable a mapping between such coordinates and pixel locations $(x_i, y_i)$ on the camera-captured image. The calibration target is disposed a known distance Z from the camera under calibration, with the target plane normal to the optical axis of the camera. Although the target preferably is formed on a plane, the target surface could in fact be curved, where the curvature is known as a function of Z. The camera is used to capture an image of the calibration target pattern, which captured image is then analyzed to build a unique 1:1 mapping relationship between each pixel $(x_i, y_i)$ in the captured image, and the real-world $(X_i, Y_i)$ location of points in the calibration target pattern. (Uniqueness ignores $2\pi$ aliasing that can result from the preferably repetitive nature of the calibration pattern.) The mapping relationship can be stored, for example in a look-up-table, and used with knowledge of Z to calculated $(x_i, y_i, z_i)$ address for any point $(X_i, Y_i, Z_i)$ in real-world space that is subsequently imaged by the camera at a known distance Z.

To improve quality of the calibration process, preferably the calibration target image is correctively pre-distorted such that the camera-captured image will be substantially undistorted. Within the plane of the calibration target, the pattern is substantially free of two-dimensional ambiguity (but for singularity points defined in the pattern). Application of such a calibration target pattern results in the presence of a distortion field at each point $(x_i, y_i)$ in the captured image. Preferably the calibration target pattern is defined using first and second frequencies that produce a calibration pattern exhibiting wavefronts with a wavelength greater than two and less than about twenty pixels of the captured image. Location of these wavefronts in the calibration target pattern is precisely known. Alternatively, first and second targets could be used, each defined using a single (but different) frequency to exhibit a single pattern of such wavefronts, although calibration using multiple targets would generally take longer than calibration with a single, multi-frequency wavefront-producing target.

Applicant has discovered that a desired calibration target image can be formed using a distance varying function, e.g., a cosine, and preferably a geometric warping coefficient. An exemplary such image $F(X)$ may be defined by $$F(X) = Ao + \sum_{i=1}^{N} Ai \cos \Omega_i^T W(X)$$

where $W(X)$ is an optional geometric warping transformation function that may in fact equal identity.

The use of N frequencies will result in a calibration target pattern with N sets of wavefronts. The resultant target pattern function $F(X)$ can be printed (or projected) and used as a target object to calibrate cameras.

The nature of the resultant target pattern is calibration can occur even if the target is rotated about the optical axis of the camera system, is displaced longitudinally along the axis, or is scaled. Good calibration image capture by the camera system under calibration can result, despite substantial variations in ambient brightness and contrast at the target pattern.

Applicant has discovered that a target pattern $F(X)$ having as few as two frequency components will suffice to uniquely determine the $(x_i, y_i)$ components of the correspondence field at each image point created by the camera from the calibration pattern target. Preferably the frequency components exhibit high spatial content, to promote calibration accuracy. However as noted, calibration can also occur using a single frequency to create a calibration target.

The image of the target calibration pattern captured by the camera under calibration will contain phase patterns such that the pattern changes in any direction. The preferably pre-distorted target calibration pattern captured by the camera system will be substantially undistorted, and as a result, a substantially linear grid of wavefronts is present in this camera-captured image. Further, density or granularity of the wavefronts in the captured image is substantially constant throughout the plane of the captured image. As a result, quality of the captured image is substantially constant throughout the image. Further, resolution of the grid-like wavefronts can approximate, without exceeding, the spatial image capability of the camera system optics.

Location of the wavefronts in the pre-distorted calibration image pattern is known. Demodulation is then carried out to determine phase in the captured image pattern, to locate the preferably linearized pattern of wavefronts in the captured image. Thus, the captured image data is demodulated to recover continuous phase functions in the form of a linear phase carrier term and a residual phase. In one embodiment, carrier parameters are estimated using spectral analysis, preferably after removing near-DC frequencies. Preferably an iteration process is carried out such that iteration eventually converges to the true phase function. Correspondence between $(X_i, Y_i)$ points in the calibration target pattern, and $(x_i, y_i)$ pixel coordinates can then be determined, to learn where on the calibration target each pixel captured an image.

As such, calibration according to the present invention exhibits substantial insensitivity to orientation and scale of the calibration pattern target and enables unique and reasonably rapid calibration of every pixel to a corresponding point in the calibration image target. Further, the present calibration technique is relatively robust as to variations in brightness and contrast, and provides a dense correspondence, even in the presence of substantial distortion in the camera optical system. In essence, use of the camera system response to the calibration target permits inference of what camera pixels correspond to what points on the calibration target, from which data vector angles between pixel points to the calibration target points may be inferred. As such, camera system distortions, for example and without limitation optical system distortions, can be identified and compensated for via calibration.

Other features and advantages of the present invention will appear from the following description in which the preferred embodiments have been set forth in detail, in conjunction with their accompanying drawings.

DETAILED DESCRIPTION OF THE PREFERRED EMBODIMENT

The present invention is applicable to any type of image forming camera, including two-dimensional focal plane arrays, scanned linear arrays, scanned single pixel configurations, with any imaging modalities and wavelengths, such as radar, visible, IR light, acoustic, etc. Camera types that may be calibrated according to the present invention may include three-dimensional range finding cameras, as well as two-dimensional intensity/RGB cameras, and may be analog or electronic digital cameras, including film-based cameras whose image has been scanned into electronic form.

Figure 1:
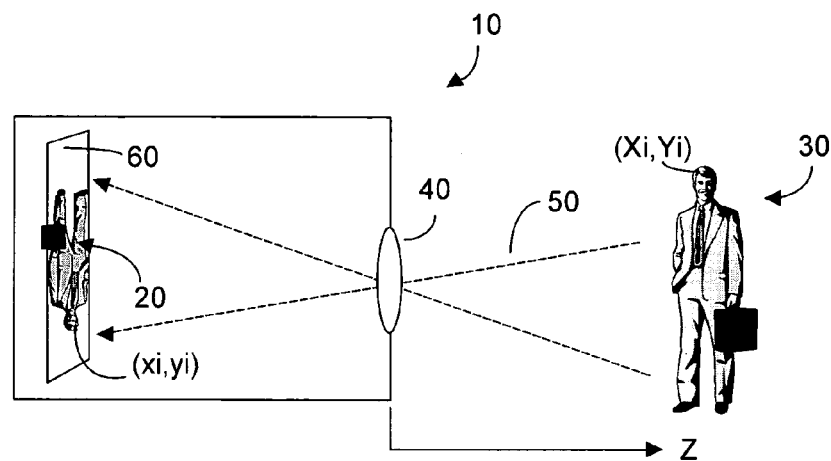
FIG. 1 depicts a generic camera system with which the present invention may be practiced, according to the prior art.
Figure 2:
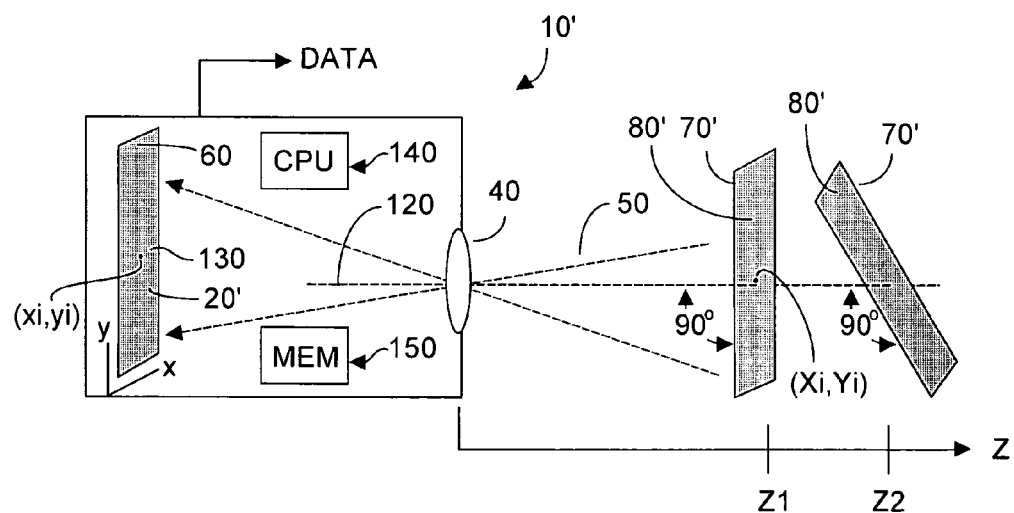
FIG. 2 depicts a camera system such as shown in FIG. 1, imaging a planar calibration target, according to the present invention.

FIG. 2 depicts a camera system 10', which may be similar to system 10 as described in FIG. 1, with a planar calibration target 70' containing a calibration pattern 80', according to the present invention. A generic system 10' may include a processor 140 functionally coupled to memory 150, which memory may include software executable by processor 140 to carry-out calibration, according to the present invention. Memory 150 may further be used to store calibrating data, perhaps a look-up-table useable to store mapping relationship data obtained with the present invention, obtained using the present invention. In some applications, it may be desirable to perform calibration after the camera system leaves the fabrication site. Understandably calibration according to the present invention may be carried out external to the camera system, such that functionally processor 140 and memory 150 may indeed be external to and not inherently part of camera system 10'. The DATA output shown in FIG. 2 can include data captured by the camera system when creating an image of the calibration target pattern 80'.

In terms of nomenclature, a target object including a calibration target 70' bearing a calibration pattern 80' exists in real-world space and can be identified in terms of coordinates $(X_i, Y_i)$, where the object is a known distance Z from the camera under calibration. An image of this target object is captured with the camera under calibration 10', and the camera-captured image 20' is formed on a plane 60, whereon pixels or points are defineable in terms of $(x_i, y_i)$ coordinates. Embodiments of the present invention provide a suitable calibration pattern 80' that facilitates such spatial calibration of the camera system. Applicant's calibration pattern and method enables camera system 10' to discern real-world $(X_i, Y_i)$ coordinates of points in the pattern 80' located distance Z from the camera system, relative to pixel locations $(x_i, y_i)$ in camera-captured image 60. The nature of the preferred calibration pattern 80', exemplified by FIG. 3A, enables accurate identification and location of the real-world object space point that is mapped to each pixel location in the camera-captured image. Preferably the target pattern 80' enable the camera to perform image processing using adjacent pixels to precisely identify the real-world point in the target that is mapped to each pixel location. (A random pattern, or other pattern lacking the harmonic-type content of applicant's calibration pattern would lack such properties.) According to the present invention, once a point in the real-world target is accurately identified, the preferably mathematical properties of the calibration pattern are used to compute the real-world $(X_i, Y_i)$ location of each target point.

Figure 3A:
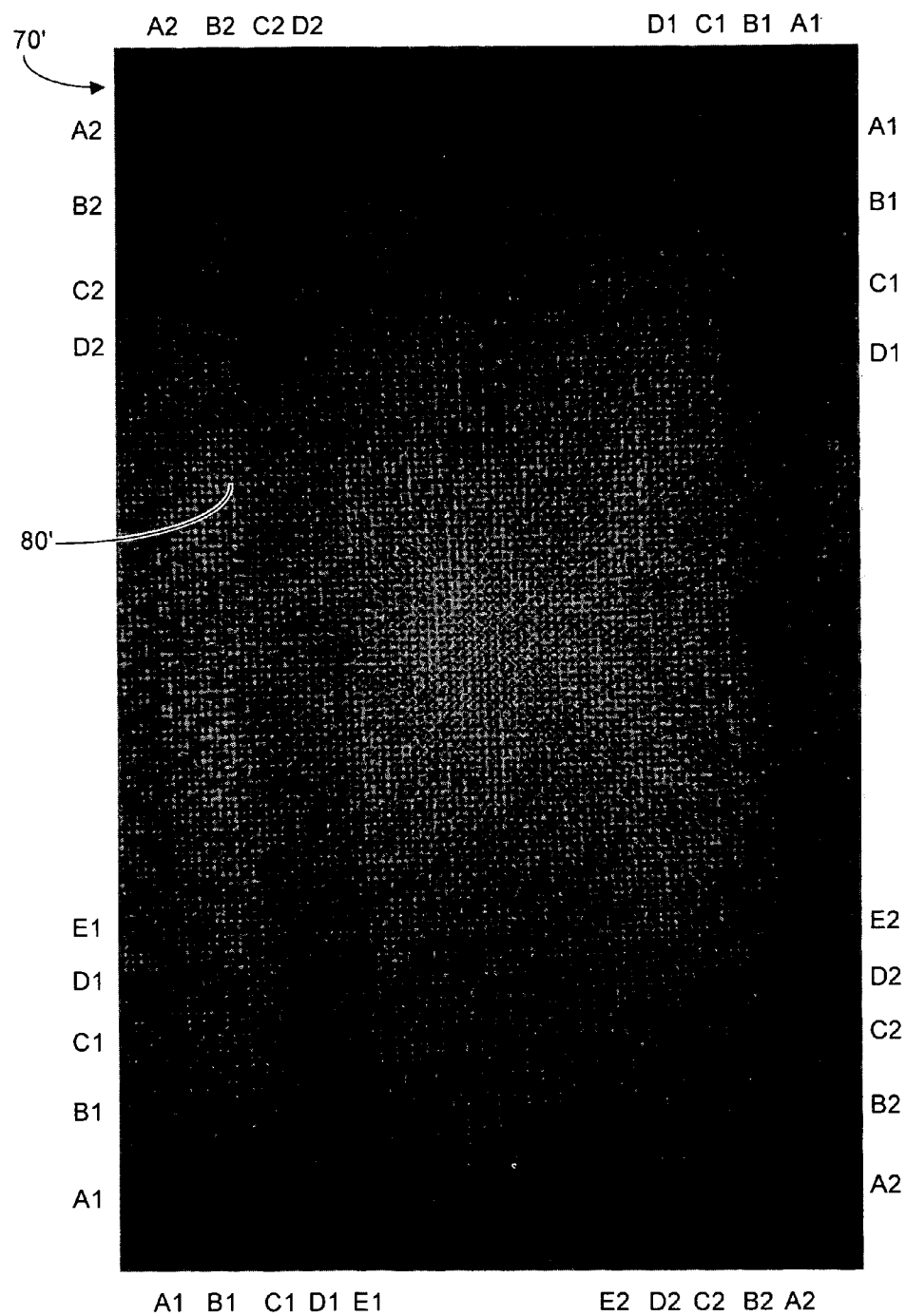
FIG. 3A is an exemplary calibration target image recommended for use with a camera system where camera system distortion tends to stretch an image, according to the prior art.
Figure 3B:
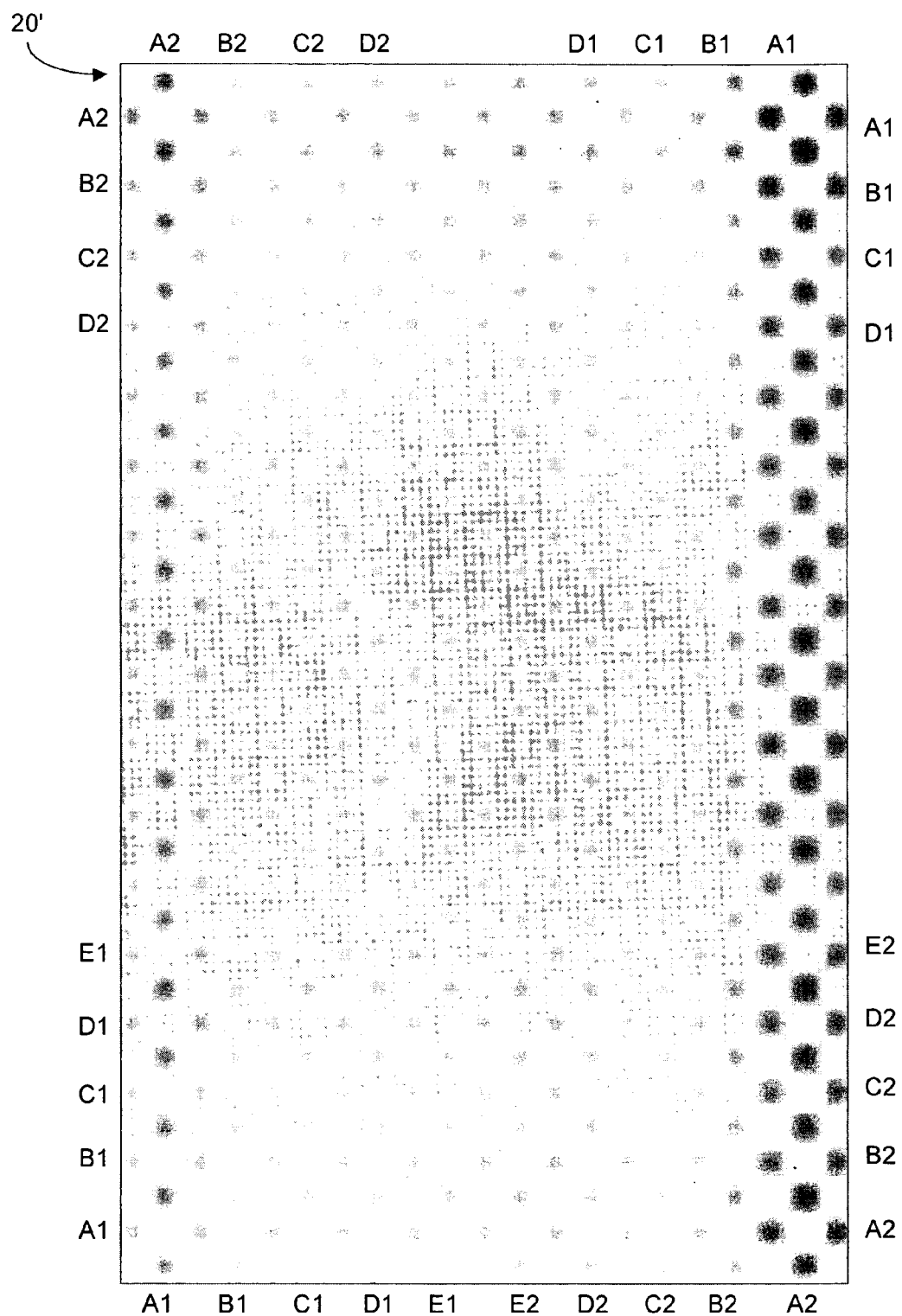
FIG. 3B is an image captured by an outwardly distorting camera system, when imaging the exemplary calibration target image of FIG. 3A, according to an embodiment of the present invention.

Preferably (but optionally) the calibration target pattern is pre-distorted, to somewhat compensate for known distortion in the camera system optical system 40. Thus an initial step of camera calibration according to the present invention includes fabricating planar calibration target 70' with preferably pre-distorted pattern 80'. It is difficult from the small figures shown in FIG. 2 to appreciate the nature of pre-distortion as used in the present invention. Such pre-distortion is more readily appreciated by comparing the large image of target 70' in FIG. 3A, with the camera-obtained image therefrom 20', shown in FIG. 3B. According to the present invention, preferably pattern 80' is defined with a pre-distortion characteristic such that the camera system-captured image 20 of the pattern will be substantially free of distortion. For example, in FIG. 3A, suppose it is known that optical lens system 40 in camera system 10' distorts captured images outwardly, although as noted, camera system distortion need not be optical in nature. Thus, pattern 80' in calibration target 70' intentionally presents a pattern with inward distortion, as shown in FIG. 3A. The resultant captured image 20', as shown in FIG. 3B, is more or less linearized by the known outward distortion characteristics of the camera system, e.g., due to lens 40 in this example.

Depending upon the sensing modality of the camera 10' to be calibrated, this calibration target will have a known pattern F(X) 80' of variation in intensity, color, and/or depth. As described further herein, that pre-distorted pattern 80' depicted in FIG. 3A represents a mathematical function F(X).

The calibration target 70' is placed a measured distance Z from the camera, perpendicular to optical axis 120 of camera 10' and image 20' is captured. As depicted in FIG. 2 by the rotated, relocated calibration target 70', according to the present invention, physical rotation and/or translation of pattern 80' in the plane of calibration target 70' may be arbitrary. More specifically, according to an embodiment of the present invention, the pattern of variation preferably is a signal that is the sum of $N \geq 2$ sinusoidal signals of the form:

$$F(X) = Ao + \sum_{i=1}^{N} Ai \cos \Omega_i^T W(X)$$

where $X = (X, Y)^T$ are two-dimensional Cartesian coordinates within the calibration target plane, $W: R^2 \rightarrow R^2$ is a geometric transformation within the plane, $\Omega_i = (\Omega_X, \Omega_Y)^T$ are chosen two-dimensional spatial frequencies, and $A_i$ are amplitude and offset constants. Preferably X, Y, Z and $\Omega_i$ are defined in physical units, for example cm and rad/cm$^{-1}$.

To a first approximation, the signal in the image 20' acquired by camera 10' will be of the form:

$$f(x)=a_0(x)+a_1(x)F(U(x))$$

where $x=(x,y)^T$ are column and row coordinates that may define pixel locations $(x_i, y_i)$ of the acquired image 20', $a_i$ are slowly varying offset and gain variation functions, and, U: $R^2 \rightarrow R^2$ is the correspondence field. Contributors to offset and gain typically include the integrated circuit chip upon which much of the camera circuitry is commonly fabricated, and camera optical system 40.

As noted, FIG. 3A is an image of a calibration target patterns F(X), generated according to the present invention for a camera system 10' whose distortion characteristics (be it due to optics 40 or otherwise) have previously been determined to distort or stretch outwardly. As such, the calibration target pattern 80' in FIG. 3A is pre-distorted to stretch inwardly. Understandably, if camera system 10' exhibited another type of distortion, calibration pattern 80' would be generated to compensate for such other type of distortion. Thus if it were known camera system 10' exhibited inward distortion, perhaps due to optics 40, then pattern 80' in calibration target 70' would be defined to present an outwardly distorted pattern. The captured image 20' would be more or less linearized by the known lens distortion, and would still appear substantially as shown in FIG. 3B

Two sinusoidal frequencies were used to generate the calibration target pattern F(X) (or 80') shown in FIG. 3A, and consequently two sets of wavefronts are apparent in pattern 80'. In FIG. 3A, these wavefronts propagate inwardly from each corner of the pattern, the inward propagation, or distortion, having been intentionally created because it was known that lens 40 tended to distort outwardly. A few of these wavefronts in pattern 80' are labeled for ease of description. For example at the upper right and lower left corner of pattern 80' shown in FIG. 3A, curved wavefront A1-A1 propagates inwardly, as do wavefronts B1-B1, C1-C1, D-1, D-1, and so forth. The nomenclature A1, B1, C1, etc. denotes that these wavefronts are attributable to the first sinusoidal frequency comprising F(X). Similarly, curved wavefronts A2-A2, B2-B2, C2-C2, etc. propagate inwardly from the upper left and lower right corners of the target pattern.

It is understood that if additional frequencies were used to generate the F(X) target pattern, there would be additional wavefronts apparent in FIG. 3A. For example, there would be three wavefronts if three frequencies had been used. It will be appreciated that the location and shape of the various wavefronts in pattern 80' on calibration target 70' is known.

For a given camera system whose optics have a more or less known distortion pattern, the desired compensating pattern function F(X) preferably is defined parametrically mathematically, although a so-called "by example" definition could also be used. Calibration pattern 80' can be printed out, for example using a plotter or the like onto a suitable substrate, white cardboard for example, although other substrates could be used. The overall size of the printed-out calibration target can depend upon the camera system under calibration, but exemplary dimension might be 1 M×2M, although non-rectangular calibration targets could also be used. As used herein, the concept of "printing" is to be broadly interpreted. Thus, printing could, without limitation, include etching, photographic creation, painting, etc. Similarly, while there may be advantages to using a planar substrate for a calibration target, the substrate could instead be curved, where the curved surface function of the substrate is known as a function of Z.

Understandably the camera system under calibration must be able to "see" the calibration target. If the camera system is an infrared (IR) camera responsive to IR frequencies, then the calibration target must be visible in these frequencies, if near IR, then the calibration target must be visible in near IR frequencies, and so forth. Applicant has found that a camera system operating at infrared (IR) wavelengths tends not to adequately image a calibration target 70' printed with a laser printer. Probably the poor imaging is due to the nature of the laser toner particles and/or the paper upon which the target pattern is printed. However applicant has found that IR camera systems 10' function satisfactorily when the calibration target has been printed with ink jet technology, preferably using an HP Design Jet 500 printer that uses HP ink jet cartridge type C4844A to print on HP universal inkjet bond paper Q1398A. Of course other printers using other technologies to print onto other media could instead be used. In printing calibration targets, it may be useful to purposely introduce so-called dithering to provide more useful information to the camera system. It should be understood that the calibration target shown in FIG. 3A could represent a calibration target that is projected onto a planar substrate, e.g., a flat wall, rather than a printed target.

While the calibration target of FIG. 3A is shown printed in gray scale, it is understood that calibration targets could be printed in color, especially if camera system 10' normally operates at such wavelengths. If desired, calibration targets 70' could be defined such that different wavefronts appear with different colors. Such targets would be very useful in calibration color camera systems, and may offer the potential to calibrate for chromatic distortion within the camera optical system.

However the calibration target is presented to the camera system, it preferably will provide image data using as much of the dynamic range of the camera system as possible without causing saturation. Thus a gray scale calibration target preferably should present a spectrum of data ranging from pure white to pure black, at intensity levels encompassing the least detectable signal level for the camera system under calibration, to the largest non-saturating detectable signal level. For a full color camera system, the calibration target may include the full spectrum of colors from pure red to pure violet, against at intensity levels within the dynamic range of the camera system, again at high intensities that will not saturate the camera system, and so forth.

FIG. 3B depicts the image 20' captured by the camera system under calibration, when camera 10' is used to image the calibration target pattern shown in FIG. 3A. Whereas wavefronts in the calibration pattern 80' of FIG. 3A were intentionally pre-distorted to bend inwardly, the outwardly distorting characteristics of optical system 40 have somewhat predictably stretched the captured image. The desired result in FIG. 3B is that the captured wavefronts A1-A1, B1-B1, C1-C1, etc., A2-A2, B2-B2, C2-C2, etc. are now substantially linearized. As such, the density or granularity of the grid-like pattern of captured wavefronts is substantially the same at the center region 130 of the captured image 20', as near the corners of the captured image.

Preferably pattern 80' is created using high spatial frequencies to produce a wavefront pattern in captured image 20' with high density in number of lines/cm so as to fully use the optical characteristics of camera 10' at the image center region. However the pattern spatial frequencies should not be so high as to present more lines of pattern than can be resolved adequately by lens 40 and sensor 60. Understandably a highest permissible density in image 20' will yield a higher quality of calibration data for purposes of calibration camera system 10'.

It will be appreciated that a linearized pattern of wavefronts such as shown in FIG. 3B could in fact be used as the calibration target pattern 80', to be imaged by camera 10'. However since it has been assumed that camera 10' distorts or stretches the captured image outwardly, the resultant captured image 20' would be an outwardly distorted grid of wavefronts. As such granularity or density of the wavefronts would not be substantially uniform throughout camera-captured image 20, and the quality of the resultant calibration would be less than would be obtained with an image pattern as shown in FIG. 3A.

Captured image 20' will contain an image function signal f(x) that is the camera optical system response to the pattern F(X) in the calibration target 70'. The captured image function f(x) may be expressed as:

$$f(x) = a_0(x) + a_1(x)A_0 + \Sigma s_i(x)\cos \phi_i(x)$$

where $s_i(x) = a_1(x)A_i$ is an amplitude function, and $\phi_i(x) = \Omega_i^T W(U(x))$ is a phase modulation function.

In overview, calibration according to the present invention demodulates f(x) to recover the continuous phase functions $\phi_i(x) = \omega_i^T x + p_i + \delta_i(x)$ in the form of a linear phase carrier term and a residual phase. With respect to FIG. 2, calibration mapping data could be included in a DATA signal output by camera system 10'. The use of a calibration target pattern 80' such as exemplified by FIG. 3A advantageously allows relatively rapid calibration with unique mapping between image pixels and points on the calibration target object. It will be appreciated that creation of a calibration target image larger than a single sinusoidal cycle requires use of phase functions greater than a $2\pi$ interval.

Recovery according to the present invention is achieved by first finding the carriers $\phi_i(x) = \omega_i^T x + p_i$, e.g., preferably using spectral analysis, and then iteratively refining each phase function. Given the phase functions, the $N \geq 2$ equations $\phi_i(x) = \Omega_i^T W(U(x))$ can be solved at each point for the two unknowns $U^1(x)$, $U^2(x)$. The calibrated three-dimensional ray direction for pixel x in image 20 is therefore $(U^1(x), U^2(x), Z)$ A judicious choice of the target pattern can simplify solution of the two unknowns $U^1(x), U^2(x)$. For example, if as shown in FIG. 3A, F(X) consists of two sinusoids with W(X)=X, $\omega_1 = (2\pi/\lambda, 0)$, $\Omega_2 = (0, 2\pi/\lambda)$, where $\lambda$ is the pattern wavelength, the solution for $U^1(x), U^2(x)$ becomes trivial.

As noted, a target pattern 80' with high spatial frequencies should be selected for greatest calibration accuracy, as granularity of wavefronts in the captured image will be increased, subject to the maximum granularity that lens 40 can handle. However if W(U(x)) is highly nonlinear, then the spatial frequency may vary over a large range over the camera-captured image. In target pattern regions where the frequency is too high, the contrast may be poor due to limitations of the camera optical system and sensor. This problem can be mitigated by designing a target pattern F(X) with a geometric transformation W(X) such that W(U(x)) would be approximately linear, given prior approximate knowledge of U(x). This is what is shown in FIGS. 3A and 3B.

Such prior knowledge of U(x) can be acquired in a number of different ways. Camera system 10' could be used to image a calibration target pattern of straight lines, or preferably using modeling, for example a known cubic radial model, such as $U(x) = kx(1 + \gamma |x|^2)$.

After camera system 10 captures an image of the calibration target, the image data is demodulated to determine mapping between points on the target and points in the captured image. Demodulation, according to the present invention may be carried out as follows. In the relatively undistorted central region 130 of the camera-captured image 20', the carrier $\phi_i(x) = \omega_i^T x + p_i$ alone can be a good model for the signal. Carrier parameters can be estimated using spectral analysis, i.e. performing a discrete Fourier transform via a fast Fourier transform (FFT) algorithm, and then detecting spectral magnitude peaks. Frequencies of these peaks yield the $\omega_i$, while the phases of the corresponding Fourier coefficients yield the $p_i$.

During demodulation, it is desired to avoid wrap-around artifacts of the discrete Fourier transform, and to emphasize the central image region 130 of captured image 20'. Accordingly, it is preferred that the spectral analysis be carried out on image f(x) not directly, but after removing the near-DC frequencies. These near-DC frequencies may be removed by subtracting out a low-pass filtered version of f(x). Preferably the central image region 130 is emphasized by weighting with a window, e.g. a Hanning window. Other techniques for removing these frequencies and for emphasizing the central image region may instead be used, however.

Due to distortion in the camera optics, e.g., lens 40, the linear phase model will not be exact, especially towards the image periphery. The nonlinearity of W(U(x)) changes the local frequency and phase of the sinusoidal signal, and will be accounted for by a residual phase term $\delta_i(x)$, as described below.

To refine the $i_{th}$ phase function estimate, the demodulated complex signal $g_i(x) = LPF_\theta(f(x)e^{-j\phi_i(x)})$ is computed, where $\phi_i(x)$ is the current phase function estimate, initially the carrier alone, and where $LPF_\theta$ is an oriented low-pass filter.

The residual phase term $\delta_i(x)$ preferably is computed by isotropic low-pass filtering of the continuous phase of $g_i(x)$. The phase estimate $\phi_i(x)$ can then be updated by adding $S_j(x)$. The oriented low-pass filter $LPF_\theta$ preferably has narrow bandwidth $b_{\parallel}$ in the direction parallel to the carrier wavefronts, and has moderate bandwidth $b_\perp$ perpendicular to the carrier wavefronts. In practice, moderate bandwidth $b_\perp$ will be a compromise, as a smaller $b_\perp$ will be more robust to noise and interference from other carriers, while a larger $b_\perp$ will improve capture range, which is to say, can handle more lens distortion.

In a preferred embodiment, an iterative demodulation strategy is adopted to achieve good capture range with small bandwidth $b_\perp$. In this embodiment, the above-described phase refinement step is repeated to gradually improve the phase estimate. Some areas of the captured target image, e.g., where there is large optical distortion during early iterations, will be characterized by an inaccurate present estimate $\phi_i(x)$. In such area, the baseband component of $f(x)e^{j\phi_i(x)}$ is a relatively wide bandwidth signal that is somewhat attenuated by $LPF_\theta$, although enough signal will pass through the low pass filter to move the estimated phase function closer to the actual value. As $\phi_i(x)$ becomes more accurate $f(x)e^{j\phi_i(x)}$ becomes smoother and closer to zero, such that signal loss becomes relatively negligible. According to the present invention, eventually, iteration will converge to the true phase function.

The continuous phase of $g_j(x)$ preferably is computed using a two-dimensional phase unwrapping algorithm. Computation assumes that $g_j(x)$ is a slowly varying function, to overcome the ill-posed nature of phase unwrapping. As such, the situation where the true value for $g_j(x)$ might suddenly increase by say 270° in going from one pixel to an adjacent pixel is avoided, where such situation is indistinguishable from $g_j(x)$ suddenly decreasing by 90°.

It is desirable to impose some global correction to the calibration process, according to the present invention. An ideal target pattern will have symmetries such that the phase solution will be ambiguous with respect to plus or minus sign inversions, $2\pi$ phase shifts, and permutations among the N sinusoids. Moreover, the target pattern will not necessarily be aligned with the desired exterior coordinate system.

As such, it is advantages and convenient to define the exterior coordinate system origin and orientation to be aligned with image coordinates. Accordingly, let $U_0(x)$ be the correspondence field resulting from the carriers alone, with residuals $\delta_i(x)$ forced to zero. Translation and rotation is selected to apply to $U_0(x)$ such that the image center maps to X=0, and the +x image axis maps to the +X exterior coordinate axis. The same transformation is then applied to the complete U(x).

In some applications it will be sufficient for the manufacturer of camera system 10' to calibrate the camera and store the calibration data in memory 150. Thus, with essentially any camera, data stored in memory 150 could be used to actually correct, or undistort, incoming optical energy, essentially on a per pixel basis.

The use of N=2 frequencies in creating pattern 80' in calibration target 70' in FIG. 3A advantageously permits calibration using a single target. However one could instead present two (or more) separate calibration targets, each containing a pattern having a single frequency. Thus one such calibration target might present a single set of wavefronts propagating perhaps generally top-to-bottom. After this first target was imaged by the camera system under calibration, a second target, containing a single set of wavefronts propagating perhaps generally left-to-right could be used, and a second image captured by the camera system under calibration. While such individual single-phase calibration targets could indeed be used for calibration, it will be appreciated that a more expedient calibration process can result from use of a single calibration target that contains at least N=2 frequencies.

Modifications and variations may be made to the disclosed embodiments without departing from the subject and spirit of the invention as defined by the following claims.

What is claimed is:

1. A calibration target definable in real-world $(X_i, Y_i)$ coordinates usable to spatially calibrate a camera system that acquires a camera-captured image definable in pixel $(x_i, y_i)$ coordinates, the calibration target including:
    a target pattern including intensity levels that change continuously in any pattern direction such that when captured by said camera system at a known distance Z said target pattern produces an image that enables said camera system to discern real-world coordinates of any point in said target pattern with respect to pixel locations in the camera-captured image of said target pattern.

2. The calibration target of claim 1, wherein said calibration target has at least one characteristic selected from a group consisting of (a) said target pattern is pre-distorted such that an image of said calibration target captured by said camera system is substantially free of distortion, (b) said target pattern is printed on media with a material selected to be visible to said camera system at wavelengths used by said camera system to capture images, said material selected from a group consisting of ink and toner, (c) said target pattern is created so as to be projectable upon a substrate with optical wavelengths selected to be visible to said camera system, and (d) said calibration target is printed on a substantially planar substrate.

3. The calibration target of claim 1, wherein said target pattern has at least one characteristic selected from a group consisting of (a) said target pattern is parametrically definable, (b) said target pattern is pre-distorted and is parametrically definable, (c) within a plane definable for said calibration target, said target pattern is substantially free of two-dimensional ambiguity except for singular points defined within said target pattern, and (d) said target pattern is pre-distorted and within a plane definable for said calibration target, said target pattern is substantially free of two-dimensional ambiguity except for singular points defined within said pre-distorted target pattern.

4. The calibration target of claim 1, wherein said target pattern is pre-distorted, and said image captured by said camera system is definable in pixels, and said target pattern is defined in terms of at least a first frequency and a second frequency, said first frequency and second frequency selected to produce a pattern in said camera-captured image, which pattern exhibits wavefronts having a wavelength greater than two and less than twenty pixels.

5. The calibration target of claim 1, wherein said target pattern is pre-distorted, and has at least one characteristic selected from a group consisting of (a) said pre-distorted calibration target is parametrically defined, (b) said pre-distorted calibration target includes at least one continuous phase function, (c) said pre-distorted calibration target includes continuous phase functions that are recoverable in an image captured by said camera system as a linear phase carrier term and a residual phase term, (d) said target pattern is created to utilize substantially a full dynamic range of said camera system; (e) said calibration target is definable as product of a geometric transformation function that may equal identity and a sum of sinusoidal frequency components; (f) said calibration target is definable as product of a geometric transformation function that may equal identity and a sum of sinusoidal frequency components, wherein said frequency components are selected to be sufficiently high to yield densely captured wavefronts in an image captured by said camera system without being more dense than said optical lens can resolve, and (g) said calibration target is definable as product of a geometric transformation function that may equal identity and a sum of sinusoidal frequency components, and includes at least one continuous phase function that is recoverable from an image captured by said camera system using demodulation techniques.

6. A calibration target definable in real-world $(X_i, Y_i)$ coordinates usable to spatially calibrate a camera system that acquires a camera-captured image definable in pixels having pixel $(x_i, y_i)$ coordinates, the calibration target including:
    a pre-distorted target pattern defined in terms of at least a first frequency and a second frequency, said first frequency and said second frequency selected to produce a pattern in said camera-captured image exhibiting wavefronts having a wavelength greater than two and less than twenty pixels, said target pattern when captured by said camera system at a known distance Z producing an image that enables said camera system to discern real-world coordinates of any point in said target pattern with respect to pixel locations in said camera-captured image of said target pattern.

7. The calibration target of claim 6,
    wherein said calibration target has at least one characteristic selected from a group consisting of (a) said target pattern is pre-distorted such that an image of said calibration target captured by said camera system is substantially free of distortion, (b) said target pattern is printed on media with a material selected to be visible to said camera system at wavelengths used by said camera system to capture images, said material selected from a group consisting of ink and toner, (c) said target pattern is created so as to be projectable upon a substrate with optical wavelengths selected to be visible to said camera system, (d) said calibration target is printed on a substantially planar substrate, and (f) said camera system includes an optical lens and said calibration target includes frequencies selected to sufficiently high to yield densely captured wavefronts in a camera-captured image without being more dense than can be resolved by said optical lens.

8. The calibration target of claim 6,
wherein said target pattern has at least one characteristic selected from a group consisting of (a) said target pattern is Parametrically definable, (b) within a plane definable for said calibration target, said target pattern is substantially free of two-dimensional ambiguity except for singular points defined within said target pattern, (c) within a plane definable for said calibration target, said target pattern is substantially free of two-dimensional ambiguity except for singular points defined within said pre-distorted target pattern, and (d) said calibration target includes at least one continuous phase function that is recoverable using demodulation techniques from said camera-captured image.

9. A method of spatially calibrating a camera system that captures an image definable in pixel coordinates $(x_i, y_i)$ on an image plane, the method comprising:
(a) providing a calibration target containing a pattern including intensity levels that change continuously in any Pattern direction, said pattern recognizable by said camera system and definable in real-world $(X_i, Y_i)$ coordinates, such that when imaged by said camera system, said pattern enables said camera system to discern by identifying and locating real-world coordinates of said pattern to pixel coordinates in said image captured by said camera system; and
(b) using said camera system to capture an image of said pattern on said calibration target;
wherein a unique 1:1 mapping between pixel coordinates and real-world coordinates is obtainable.

10. The method of claim 9, wherein step (a) includes at least one of (i) providing a calibration target whose said pattern enables said camera system to image process said image captured by said camera system, using adjacent pixels, to identify and locate said real-world coordinates of said pattern to said pixel coordinates in said image captured by said camera system, (ii) providing a pattern that is pre-distorted such that said image captured by said camera system will provide a substantially undistorted image on said image plane, said pattern comprising at least a first set of wavefronts, (iii) providing a parametrically defined calibration target pattern, (iv) providing a parametrically defined calibration target pattern that is pre-distorted such that a camera system image thereof is less distorted than said calibration target pattern containing a parametrically defined pattern, and (v) providing a pattern utilizing substantially full dynamic range of said camera system, (vi) providing a pattern comprising at least a first set of wavefronts, and (vii) providing said calibration target at a distance Z from said camera system.

11. The method of claim 9, wherein:
step (b) further includes examining said image captured by said camera system to build a unique 1:1 mapping relationship between each pixel coordinate $(x_i, y_i)$ in said image, with real-world coordinates $(X_i, Y_i)$ of points on said calibration target pattern;
wherein said mapping relationship is storable and useable to calculate a relationship between real-world coordinates of an object to be imaged with said camera system, and pixel coordinates of an image of said object captured with said camera system.

12. The method of claim 9, wherein:
step (a) includes providing a calibration target pattern that includes at least a first set of wavefronts; and
step (b) includes identifying in said image a pattern of a first set of captured wavefronts that correspond to said first set of wavefronts in said calibration target and determining said mapping relationship from a comparison of said first set of wavefronts with said captured wavefronts.

13. The method of claim 9, wherein:
step (a) includes providing a calibration target pattern further including a second set of wavefronts; and
step (b) further includes identifying a second set of captured wavefronts corresponding to said second set of wavefronts in said calibration target, and determining said mapping relationship from a comparison of said first set and said second set of wavefronts with said first set and said second set of capture wavefronts.

14. The calibration target of claim 6, wherein said target pattern has at least one characteristic selected from a group consisting of (a) said pre-distorted calibration target is parametrically defined, (b) said pre-distorted calibration target includes at least one continuous phase function, (c) said pre-distorted calibration target includes continuous phase functions that are recoverable in an image captured by said camera system as a linear phase carrier term and a residual phase term, (d) said target pattern is created to utilize substantially a full dynamic range of said camera system; (e) said calibration target is definable as product of a geometric transformation function that may equal identity and a sum of sinusoidal frequency components; (f) said calibration target is definable as product of a geometric transformation function that may equal identity and a sum of sinusoidal frequency components, wherein said frequency components are selected to be sufficiently high to yield densely captured wavefronts in an image captured by said camera system without being more dense than said optical lens can resolve, and (g) said calibration target is definable as product of a geometric transformation function that may equal identity and a sum of sinusoidal frequency components, and includes at least one continuous phase function that is recoverable from an image captured by said camera system using demodulation techniques.

15. The method of claim 9, wherein step (a) includes at least one of (i) providing a calibration target that is pre-distorted, (ii) providing a calibration target that is pre-distorted and is parametrically definable, (iii) providing a calibration target that is pre-distorted such that within a plane of said calibration target, said pre-distorted target pattern is substantially free of two-dimensional ambiguity except for singular points defined within said pre-distorted target pattern, (iv) providing a calibration target that is pre-distorted and defines a pattern in terms of at least a first frequency and a second frequency where said first and second frequency are selected to produce a distortion function in said camera system captured mage, which distortion function exhibits wavefronts having a wavelength greater than two and less than twenty pixels, and (v) providing a calibration target on a substantially planar substrate.

16. The method of claim 9, wherein step (a) includes providing a calibration target that includes a pre-distorted calibration pattern having at least one characteristic selected from a group consisting of (i) said pre-distorted calibration target is parametrically defined, (ii) said pre-distorted calibration target includes at least one continuous phase function, (iii) said pre-distorted calibration target includes continuous phase functions that are recoverable in an image captured by said camera system as a linear phase carrier term and a residual phase term.

17. The method of claim 9, wherein:
step (a) includes providing a calibration target pattern definable with at least a first phase; and
step (b) further includes at least one of (i) demodulating a signal in said image captured by said camera system to recover at least one of a linear phase carrier term, and a residual phase term, (ii) iteratively identifying each phase function in said image captured by said camera system, and (iii) determining a calibrated three-dimensional ray direction for pixel in said camera system captured image.

18. The method of claim 9, wherein step (b) further includes imposing global correction such that alignment is imposed between real-world coordinates defined in calibrated target object, and pixel coordinates in said image captured by said camera system.

19. The method of claim 11, wherein at least a portion of step (b) is carried out in a manner selected from a group consisting of (i) said portion is executed within said camera system, and (ii) said portion is executed external to said camera system.

20. A camera system including an image plane definable in pixels, upon which an image of a target may be captured, said camera system including:
storage, associated with said camera system, to store data used during calibration of said camera system;
said camera system having been calibrated by using one of (a) a calibration target definable in real-world $(X_i, Y_i)$ coordinates usable to spatially calibrate said camera system during acquisition of a camera-captured image definable in pixel $(x_i, y_i)$ coordinates, the calibration target including a target pattern including intensity levels that change continuously in any pattern direction such that when captured by said camera system at a known distance Z said target pattern produces an image that enables said camera system to discern real-world coordinates of any point in said target pattern with respect to pixel locations in the camera-captured image of said target pattern; and (b) a calibration target definable in real-world $(X_i, Y_i)$ coordinates usable to spatially calibrate said camera system during acquisition of a camera-captured image definable in pixels having pixel $(x_i, y_i)$ coordinates, the calibration target including a pre-distorted target pattern defined in terms of at least a first frequency and a second frequency, said first frequency and said second frequency selected to produce a pattern in said camera-captured image exhibiting wavefronts having a wavelength greater than two and less than twenty pixels, said target pattern when captured by said camera system at a known distance Z producing an image that enables said camera system to discern real-world coordinates of any point in said target pattern with respect to pixel locations in said camera-captured image of said target pattern.

21. The camera system of claim 20, wherein said memory stores at least one of (i) an executable software routine used during calibration of said camera system, (ii) calibration data for said camera system, which data is used during calibration of said camera system, and (iii) a look-up table storing mapping relationship data obtaining during calibration of said camera system.

22. The camera system of claim 20(a), wherein said calibration target has at least one characteristic selected from a group consisting of (a1) said target pattern is pre-distorted such that an image of said calibration target captured by said camera system is substantially free of distortion, (a2) said target pattern is printed on media with a material selected to be visible to said camera system at wavelengths used by said camera system to capture images, said material selected from a group consisting of ink and toner, (a3) said target pattern is created so as to be projectable upon a substrate with optical wavelengths selected to be visible to said camera system, and (d) said calibration target is printed on a substantially planar substrate, (a4) said target pattern is parametrically definable, (a5) said target pattern is pre-distorted and is parametrically definable, (a6) within a plane definable for said calibration target, said target pattern is substantially free of two-dimensional ambiguity except for singular points defined within said target pattern, and (a7) said target pattern is pre-distorted and within a plane definable for said calibration target, said target pattern is substantially free of two-dimensional ambiguity except for singular points defined within said pre-distorted target pattern.

23. The camera system of claim 20(b), wherein said calibration target has at least one characteristic selected from a group consisting of (b1) said target pattern is pre-distorted such that an image of said calibration target captured by said camera system is substantially free of distortion, (b2) said target pattern is printed on media with a material selected to be visible to said camera system at wavelengths used by said camera system to capture images, said material selected from a group consisting of ink and toner, (b3) said target pattern is created so as to be projectable upon a substrate with optical wavelengths selected to be visible to said camera system, (b4) said calibration target is printed on a substantially planar substrate, (b5) said camera system includes an optical lens and said calibration target includes frequencies selected to sufficiently high to yield densely captured wavefronts in a camera-captured image without being more dense than can be resolved by said optical lens, and (b6) said calibration target includes at least one continuous phase function that is recoverable from an image captured by said camera system using demodulation techniques.

24. The camera system of claim 20(b), wherein said calibration target has at least one characteristic selected from a group consisting of (b1) said pre-distorted calibration target is parametrically defined, (b2) said pre-distorted calibration target includes at least one continuous phase function, (b3) said pre-distorted calibration target includes continuous phase functions that are recoverable in an image captured by said camera system as a linear phase carrier term and a residual phase term, (b4) said target pattern is created to utilize substantially a full dynamic range of said camera system; (b5) said calibration target is definable as product of a geometric transformation function that may equal identity and a sum of sinusoidal frequency components; (b6) said calibration target is definable as product of a geometric transformation function that may equal identity and a sum of sinusoidal frequency components, wherein said frequency components are selected to be sufficiently high to yield densely captured wavefronts in an image captured by said camera system without being more dense than said optical lens can resolve, and (b7) said calibration target is definable as product of a geometric transformation function that may equal identity and a sum of sinusoidal frequency components and includes at least one continuous phase function that is recoverable from an image captured by said camera system using demodulation techniques.

25. The camera system of claim 20, wherein said camera system includes an optical lens, and is calibrated to compensate for distortion other than distortion in said optical lens.

26. The method of claim 9, wherein said target pattern has at least one characteristic selected from a group consisting of (a) said pre-distorted calibration target is parametrically defined, (b) said pre-distorted calibration target includes at least one continuous phase function, (c) said pre-distorted calibration target includes continuous phase functions that are recoverable in an image captured by said camera system as a linear phase carrier term and a residual phase term, (d) said target pattern is created to utilize substantially a full dynamic range of said camera system; (e) said calibration target is definable as product of a geometric transformation function that may equal identity and a sum of sinusoidal frequency components; (f) said calibration target is definable as product of a geometric transformation function that may equal identity and a sum of sinusoidal frequency components, wherein said frequency components are selected to be sufficiently high to yield densely captured wavefronts in an image captured by said camera system without being more dense than said optical lens can resolve, and (g) said calibration target is definable as product of a geometric transformation function that may equal identity and a sum of sinusoidal frequency components, and includes at least one continuous phase function that is recoverable from an image captured by said camera system using demodulation techniques.

27. A method of spatially calibrating a camera system that captures an image definable in pixel coordinates $(x_i, y_i)$ on an image plane, the method comprising:
  (a) providing a calibration target definable in real-world $(X_i, Y_i)$ coordinates usable to spatially calibrate a camera system that acquires a camera-captured image definable in pixels having pixel $(x_i, y_i)$ coordinates, the calibration target including:
    a pre-distorted target pattern defined in terms of at least a first frequency and a second frequency, said first frequency and said second frequency selected to produce a pattern in said camera-captured image exhibiting wavefronts having a wavelength greater than two and less than twenty pixels, said target pattern when captured by said camera system at a known distance Z producing an image that enables said camera system to discern real-world coordinates of any point in said target pattern with respect to pixel locations in said camera-captured image of said target pattern; and
  (b) using said camera system to capture an image of said pattern on said calibration target.

28. The method of claim 27, wherein at step (a), said target pattern has at least one characteristic selected from a group consisting of (i) said target pattern is parametrically definable, (ii) within a plane definable for said calibration target, said target pattern is substantially free of two-dimensional ambiguity except for singular points defined within said target pattern, (iii) within a plane definable for said calibration target, said target pattern is substantially free of two-dimensional ambiguity except for singular points defined within said pre-distorted target pattern, and (iv) said calibration target includes at least one continuous phase function that is recoverable using demodulation techniques from said camera-captured image.

29. The method of claim 27, wherein at step (a), said target pattern has at least one characteristic selected from a group consisting of (i) said pre-distorted calibration target is parametrically defined, (ii) said pre-distorted calibration target includes at least one continuous phase function, (iii) said pre-distorted calibration target includes continuous phase functions that are recoverable in an image captured by said camera system as a linear phase carrier term and a residual phase term, (iv) said target pattern is created to utilize substantially a full dynamic range of said camera system; (v) said calibration target is definable as product of a geometric transformation function that may equal identity and a sum of sinusoidal frequency components; (vi) said calibration target is definable as product of a geometric transformation function that may equal identity and a sum of sinusoidal frequency components, wherein said frequency components are selected to be sufficiently high to yield densely captured wavefronts in an image captured by said camera system without being more dense than said optical lens can resolve, and (vii) said calibration target is definable as product of a geometric transformation function that may equal identity and a sum of sinusoidal frequency components, and includes at least one continuous phase function that is recoverable from an image captured by said camera system using demodulation techniques.

30. The method of claim 27, wherein at step (a), said target pattern has at least one characteristic selected from a group consisting of (i) said target pattern is parametrically definable, (ii) within a plane definable for said calibration target, said target pattern is substantially free of two-dimensional ambiguity except for singular points defined within said target pattern, (iii) within a plane definable for said calibration target, said target pattern is substantially free of two-dimensional ambiguity except for singular points defined within said pre-distorted target pattern, and (iv) said calibration target includes at least one continuous phase function that is recoverable using demodulation techniques from said camera-captured image.

* * * * *